(12) United States Patent
Su-Hui

(10) Patent No.: US 6,334,575 B1
(45) Date of Patent: Jan. 1, 2002

(54) SAFETY TRANSACTION METHOD

(75) Inventor: Liang Su-Hui, Taipei (TW)

(73) Assignee: Singular Technology Corp., Taipei (TW)

(*) Notice: Subject to any disclaimer, the term of this patent is extended or adjusted under 35 U.S.C. 154(b) by 0 days.

(21) Appl. No.: 09/702,893

(22) Filed: Nov. 1, 2000

(51) Int. Cl.$^7$ .............................................. G06K 19/06
(52) U.S. Cl. ...................................... 235/492; 235/380
(58) Field of Search ................................. 235/492, 380; 705/64

(56) References Cited

U.S. PATENT DOCUMENTS 6,234,389 B1 * 5/2001 Valliani ....................... 235/492

FOREIGN PATENT DOCUMENTS

EP           737907      * 10/1996

* cited by examiner

Primary Examiner—Harold I. Pitts
(74) Attorney, Agent, or Firm—Bacon & THomas, PLLC

(57) ABSTRACT

A safety transaction method through a PDFA (portable data & financing assistance) main unit formed of a PDA, a card reader, a fingerprint module, and a wireless communication module. The transaction method includes the steps of the steps of: (a) calling a bill built in a PDA (personal digital assistant) in a PDFA (portable data & financing assistance) main unit, (b) inputting the amount consumed. (c) inserting a shop data identification card of the shop in which the transaction is to be done, and then reading the data of the inserted shop data identification card and then inputting the data of the inserted shop data identification card automatically or by labor, (d) removing the inserted shop data identification card from said PDFA main unit, and then inserting the personal data credit card of the consumer, and then clicking a quick-dial key to connect to the financial center who issues the shop data identification card through a wireless communication module of said PDFA main unit, and (e) inputting the consumer's fingerprint, so as to complete the transaction after recognition of the inputted fingerprint by a finger print module of said PDFA main unit.

9 Claims, 3 Drawing Sheets

SAFETY TRANSACTION METHOD

BACKGROUND OF THE INVENTION

The present invention relates to a safety transaction method and, more particularly, to such a safety transaction method, which directly connects the user's PDFA main unit to a financing center through a wireless communication module via a shop data identification card, and to recognize the personal data credit card and the fingerprint before the completion of the transaction.

Following fast development of technology and of social business activities, plastic money has been intensively used instead of coins and paper currency. A plastic money transaction is done by means of a credit card and a card reader. During a plastic money transaction, the clerk inserts the credit card or IC card of the consumer in a card reader being linked to a bank, and then inputs the amount consumed into the bill, and then transfers the bill to the consumer for a signature. After transaction, the clerk gives the receipt of the bill to the consumer. This use of the hardware apparatus (card reader) in the aforesaid transaction is not safe. During the transaction, the card number and security code of the credit card or IC card can easily be scanned illegally for making a counterfeit. Most credit card/IC card users and the credit card/IC card issuing banks worry about this problem.

SUMMARY OF THE INVENTION

The present invention has been accomplished to provide a safety transaction method, which eliminates the aforesaid problem. According to the present invention, the shop data identification card of the shop under transaction is inserted into a PDFA main unit carried by the consumer to input the data of the shop data identification card into the PDFA main unit, and then the PDFA main unit is linked to the financing center who issues the shop data identification card, and then the transaction is done after recognition of the user's fingerprint.

DETAILED DESCRIPTION OF THE PREFERRED EMBODIMENT

Figure 1:
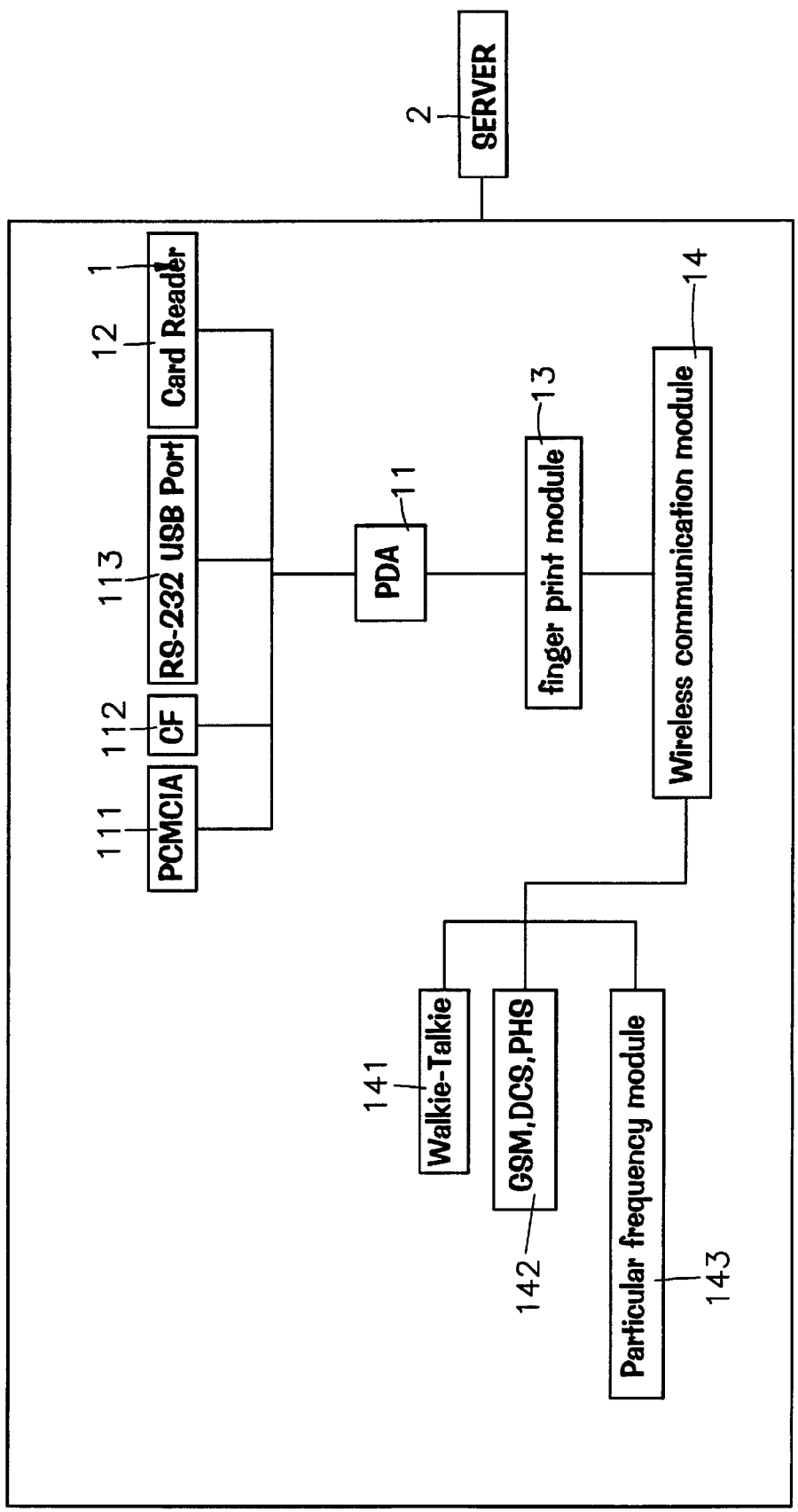
FIG. 1 is a system block diagram of the main unit (PDFA) according to the present invention.

Referring to FIG. 1, the main unit 1 in accordance with the present invention is a PDFA (portable data & financing assistance) comprising a PDA (personal data assistant) 11, a card reader 12, a finger print module 13, and a wireless communication module 14. The PDA 11 comprises a plug-and-play PCMCIA card 111/memory (CF) card 112 insertion interface slot and a RS-232 USB port 113. The wireless communication module 14 can be a walkie-talkie module 141, a general communication of GSM, DCS or PHS system (cellular telephone) 142, or a particular frequency module 143 for voice communication and data transmission. When a walkie-talkie module 142 is used, the code of the opposing party is inputted into the walkie-talkie module 142, and then voice communication is started upon receipt of an answer from the opposing party. When a general communication module (i.e., a cellular telephone) is used, the user must insert a personal data credit card (built-in) before dialing the number, and then input the fingerprint for recognition by the main unit 1, so as to start voice communication after recognition of the inputted fingerprint by the main unit 1. The particular frequency module 143 is adapted for transmitting data, and storing the data in a server 2 being connected to the main unit 1, enabling the main unit 1 to fetch the data from the server 2 and then to file the data in the PCMCIA card 111 or the memory (CF) card 112.

Figure 2:
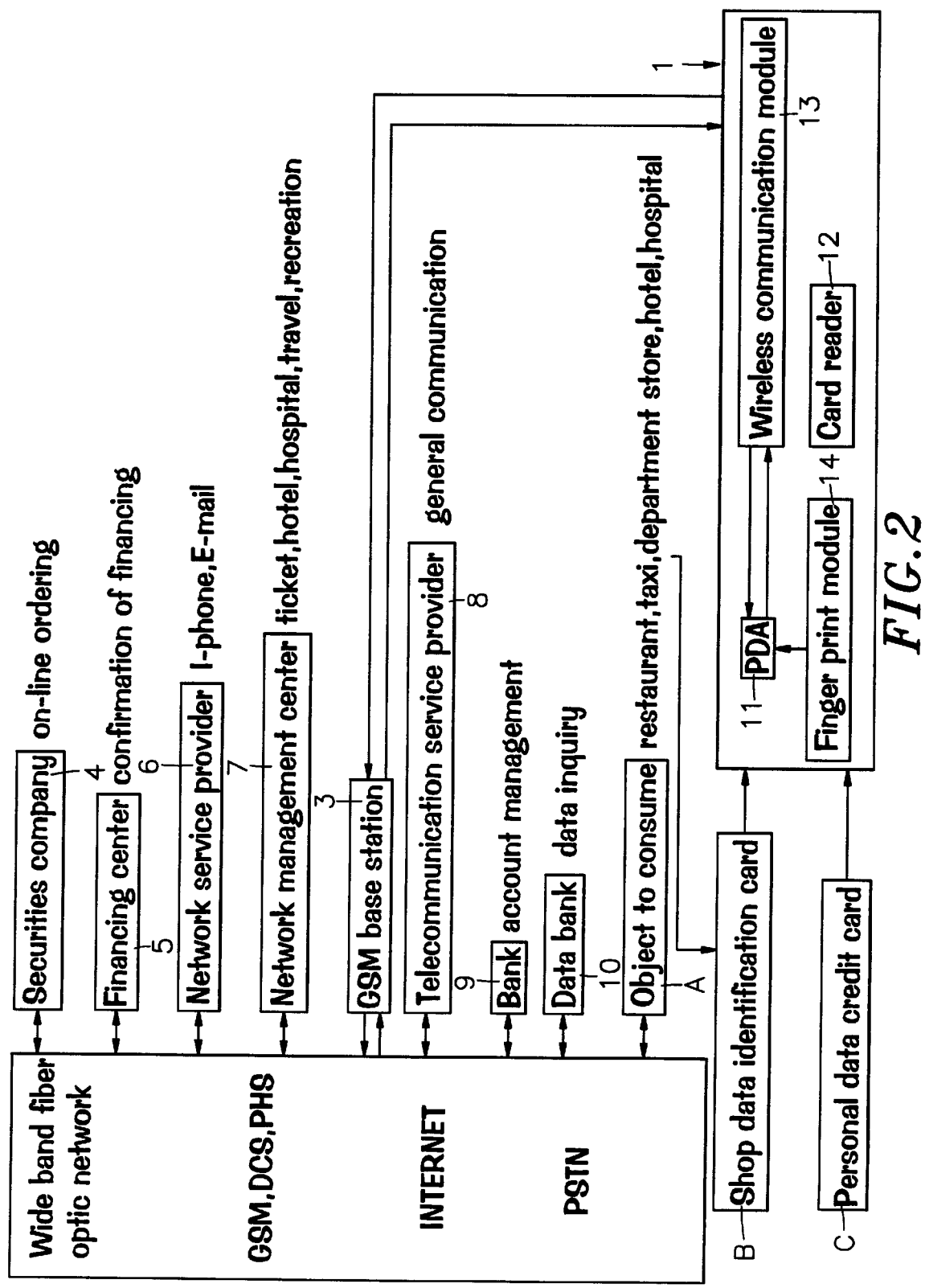
FIG. 2 is a system block diagram showing the application of the present invention.

FIG. 2 is a system block diagram of the present invention. Through a GSM base station 3, the main unit 1 can be connected to a PSTN (public service telecommunication network), the Internet, a GSM, DCS or PHS provider, or a wide band fiber optic network, to communicate with a securities company 4 for on-line ordering, a financial center 5 for confirmation of financing, a network service provider 6 for sending and receiving I-phone or E-mail, a network management center 7 for ticket, hotel, hospital, travel and recreational service information enquiring and ticket booking, a telecommunication service provider 8 for general on-line communication, a bank 9 for account management, a databank 10 for on-line inquiry, or a contracted object to consume (such as restaurant, taxi company, department store, hotel, or hospital) A for a transaction.

Figure 3:
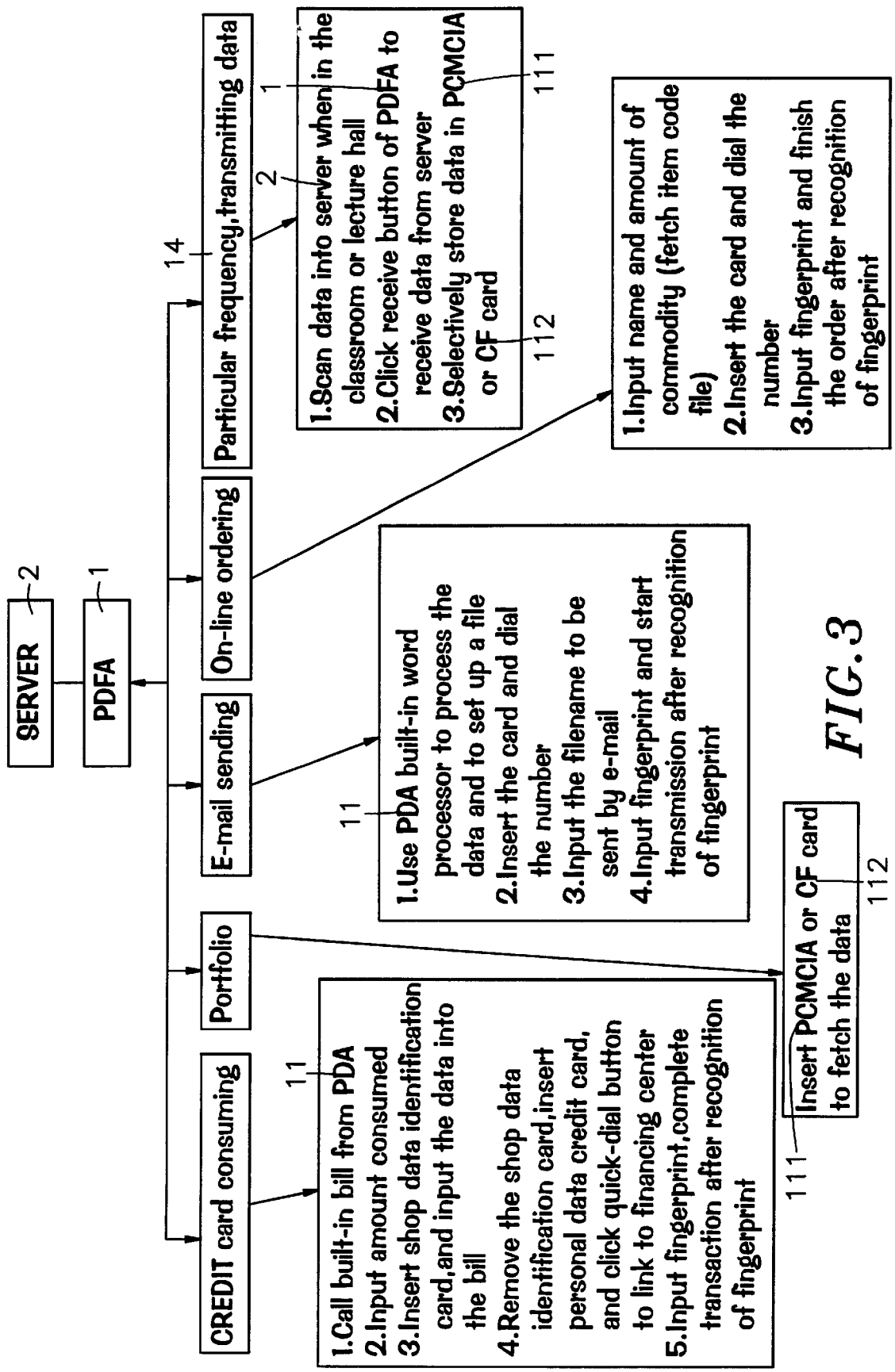
FIG. 3 is a flow chart showing different operation flows of the present invention.

FIG. 3 illustrates the operation flow of every function of the present invention. The functions of the present invention include transaction, communication, and databank. The operation of the functions are outlined hereinafter:

The transaction procedure of personal data credit card consuming includes the steps of:

(1) calling the bill built in the PDA 11 in the main unit (PDFA) 1;

(2) inputting the amount consumed;

(3) inserting the shop data identification card B, and then reading the data of the inserted shop data identification card B, and then inputting the data automatically or by labor;

(4) removing the inserted shop data identification card B from the main unit (PDFA) 1, and then inserting the personal data credit card C of the consumer into the main unit (PDFA) 1, and then clicking the quick-dial key to connect to the financial center 5 who issues the shop data identification card B through the wireless communication module 14; and (5) inputting the user's fingerprint, so as to complete the transaction after recognition of the inputted fingerprint by the main unit (PDFA) 1.

The transaction procedure of on-line ordering includes the steps of:

(1) inputting the name and amount of commodity to be ordered (fetching the item code file);

(2) inserting the personal data credit card C and then clicking the quick-dial key to connect to the financial center 5;

(3) inputting the user's fingerprint, so as to complete the transaction after recognition of the inputted fingerprint by the main unit (PDFA) 1.

The procedure of sending an e-mail includes the steps of:

(1) using the word processing software in the PDA 11 to process the data to be sent by e-mail and then setting up a file;

(2) inserting the personal data credit card C and then clicking the quick-dial key to connect to the network service provider 6;

(3) inputting the filename of the file to be sent by e-mail; and (4) inputting the user's fingerprint, so as to complete the dispatch of the file by e-mail after recognition of the inputted fingerprint by the main unit (PDFA) 1.

The procedure of transmitting data through the particular frequency module 143 includes the steps of:

(1) scanning the data to be transmitted into the server 2 when in the classroom or lecture hall;

(2) clicking the receiving button of the main unit (PDFA) 1 to receive data transmitted through the server 2; and (3) selectively storing the data in the PCMCIA card 111 or the memory (CF) card 112.

The main unit (PDFA) 1 provides also the portfolio function. It reads the data after insertion of the PCMCIA card 11 or the memory (CF) card 12 in the card reader 12.

Because the transaction method of the present invention, when using the personal data credit card, is highly safe, it prevents shops from stealing the code of the credit card to make a counterfeit.

Further, a shop data identification card B according to the present invention has a credit card function. Receiving a personal data credit card C is a direct transaction, and the transaction can be done only after the fingerprint had been recognized when using a shop data identification card B to consume goods or services in another shop.

While only one embodiment of the present invention has been shown and described, it will be understood that various modifications and changes could be made thereunto without departing the spirit and scope of the invention disclosed.

What the invention claimed is:

1. A safety transaction method of using a credit card to make a transaction, comprising the steps of:

(1) calling a bill built in a PDA, personal digital assistant, in a PDFA, portable data & financing assistance, main unit;

(2) inputting the amount consumed;

(3) inserting a shop data identification card of the shop in which the transaction is to be done, and then reading the data of the inserted shop data identification card and then inputting the data of the inserted shop data identification card automatically or by labor;

(4) removing the inserted shop data identification card from said PDFA main unit, and then inserting the personal data credit card of the consumer, and then clicking a quick-dial key to connect to the financial center who issues the shop data identification card through a wireless communication module of said PDFA main unit; and (5) inputting the consumer's fingerprint, so as to complete the transaction after recognition of the inputted fingerprint by a finger print module of said PDFA main unit.

2. The safety transaction method of claim 1, wherein said PDFA main unit comprises a card reader adapted to read the data of said shop data identification card and said personal data credit card.

3. The safety transaction method of claim 1, wherein said PDA of said PDFA main unit comprises a plug-and-play PCMCIA card/memory, CF, card insertion interface slot and a RS-232 USB, universals serial bus, port.

4. The safety transaction method of claim 1, wherein the wireless communication module of said PDFA main unit comprises a walkie-talkie module, a GSM/DCS/PHS system, and a particular frequency module.

5. The safety transaction method of claim 3, wherein said PDFA main unit provides the function of portfolio after insertion of a plug-and-play PCMCIA card/memory CF, card.

6. The safety transaction method of claim 4, further comprising an e-mail sending procedure through said PDFA main unit, said e-mail sending procedure including the step of using a word processing software built in said PDA to process the data to be sent by e-mail and then setting up a file in said PDA, the step of inserting the personal data credit card of the user into said PDFA main unit and then inputting the file name of the file to be sent by e-mail, and the step of inputting the user's finger print, so as to complete the dispatch of the file by e-mail after recognition of the inputted finger print by said finger print module of said PDFA main unit.

7. The safety transaction method of claim 4, further comprising an on-line ordering procedure, said on-line ordering procedure comprising the step of inputting the name of amount of the commodity to be ordered, fetching the item code file, and the step of inserting the personal data credit card of the user into said PDFA main unit and then clicking a quick-dial button of said PDFA main unit, and the step of inputting the user's finger print, so as to complete the transaction after recognition of the inputted finger print by said finger print module of said PDFA main unit.

8. The safety transaction method of claim 4, further comprising a data transmitting procedure through a particular frequency module of said wireless communication module, said data transmitting procedure comprising the step of scan-storing the data to be transmitted in a server being linked to said PDFA main unit, the step of clicking a receiving button of said PDFA main unit to receive the data from said server, and the step of selectively storing the data in a plug-and-play PCMCIA card or memory, CF, card being in said PDFA main unit.

9. The safety transaction method of claim 1, wherein said shop data identification card has the function of a credit card.

* * * * *